R. H. HUTCHINSON.
OPERATING MECHANISM FOR DIRECTION INDICATORS FOR VEHICLES.
APPLICATION FILED APR. 2, 1912.
1,199,384.
Patented Sept. 26, 1916.
4 SHEETS—SHEET 1.
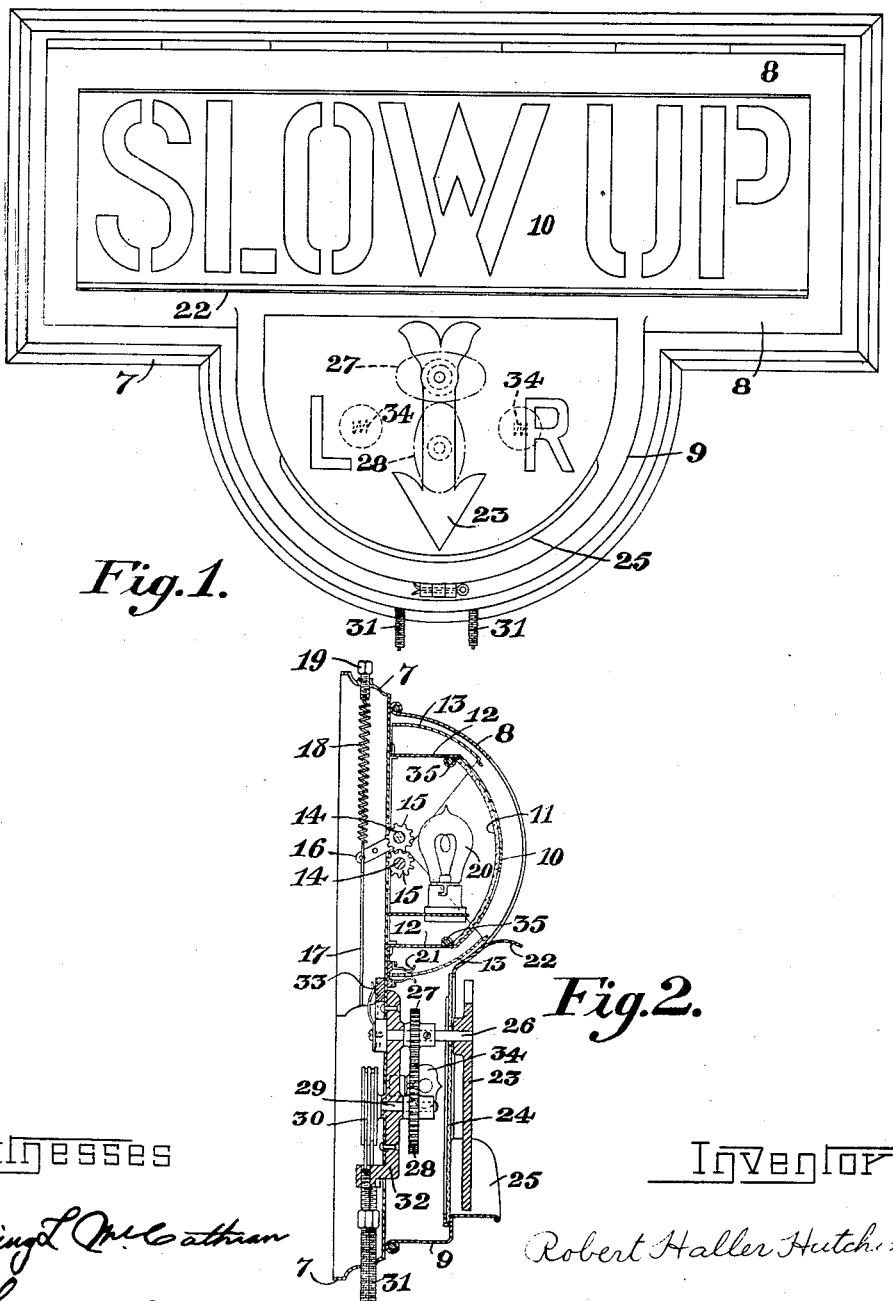

R. H. HUTCHINSON.
OPERATING MECHANISM FOR DIRECTION INDICATORS FOR VEHICLES.
APPLICATION FILED APR. 2, 1912.

1,199,384.

Patented Sept. 26, 1916.
4 SHEETS—SHEET 2.

Witnesses

Inventor
Robert Haller Hutchinson

R. H. HUTCHINSON.
OPERATING MECHANISM FOR DIRECTION INDICATORS FOR VEHICLES.
APPLICATION FILED APR. 2, 1912.

1,199,384. Patented Sept. 26, 1916.
4 SHEETS—SHEET 3.

R. H. HUTCHINSON.
OPERATING MECHANISM FOR DIRECTION INDICATORS FOR VEHICLES.
APPLICATION FILED APR. 2, 1912.
1,199,384.
Patented Sept. 26, 1916.
4 SHEETS—SHEET 4.
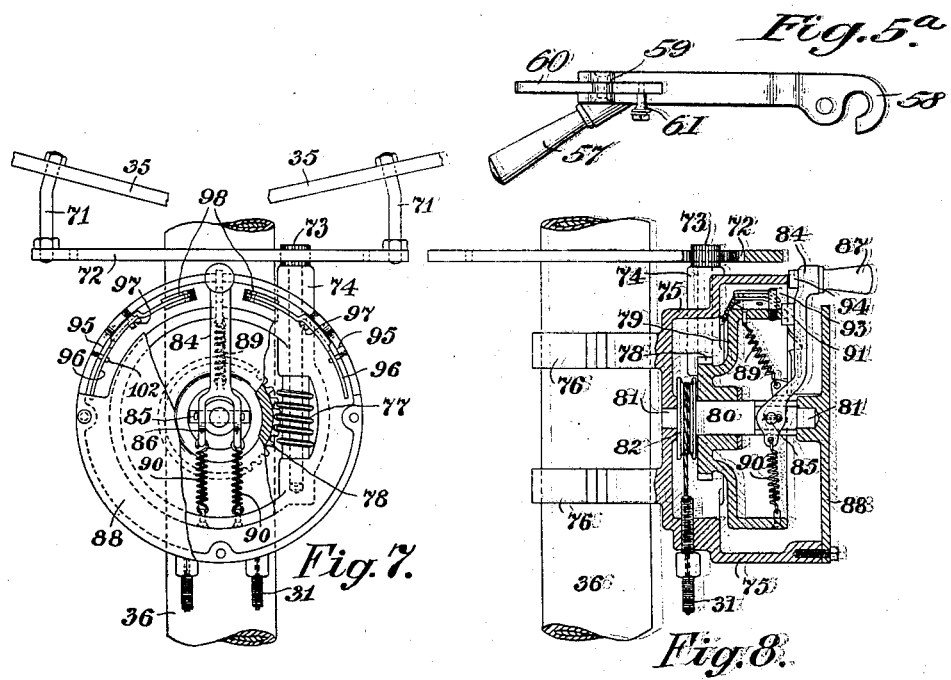
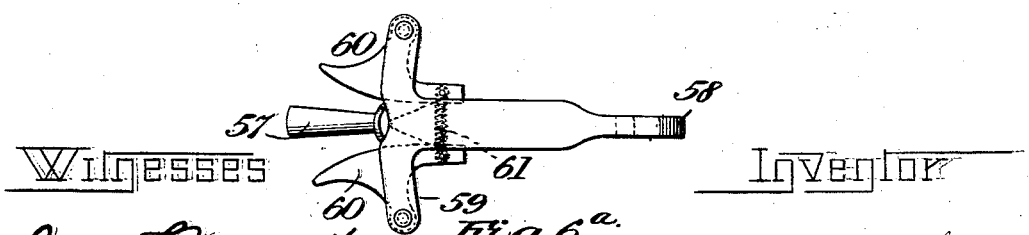

UNITED STATES PATENT OFFICE.

ROBERT HALLER HUTCHINSON, OF LIVERPOOL, ENGLAND.

OPERATING MECHANISM FOR DIRECTION-INDICATORS FOR VEHICLES.

1,199,384.  Specification of Letters Patent.  Patented Sept. 26, 1916.

Application filed April 2, 1912. Serial No. 688,003.

*To all whom it may concern:*

Be it known that I, ROBERT HALLER HUTCHINSON, a subject of the King of Great Britain, residing at Liverpool, in the county of Lancaster, in the Kingdom of England, have invented certain new and useful Improvements in Operating Mechanism for Direction-Indicators of Vehicles, of which the following is a specification.

Direction indicators applicable to vehicles are already known, such indicators usually comprising an arm, pointer or the like and operating mechanism therefor connected to the steering mechanism of the vehicle so that the device shows when the vehicle is about to turn toward one side or other. Such indicators are usually mounted at the rear of the vehicle for the purpose of giving signals to the drivers of following vehicles.

It is the object of the present invention to provide an actuating mechanism for such indicators whereby they may be operated either automatically from the steering gear or by hand as may be desired.

A further object is to provide an actuating mechanism for such indicators whereby, when the mechanism has been moved manually to give an advance signal, it will automatically return to its operation by the steering gear when the advance signal has served its purpose.

Still further objects and improvements forming part of this invention will appear from the following description and from the claims at the end thereof.

Figure 3:
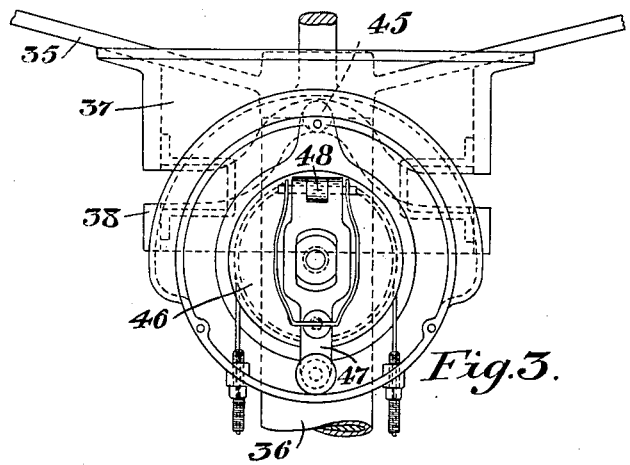
Figure 4:
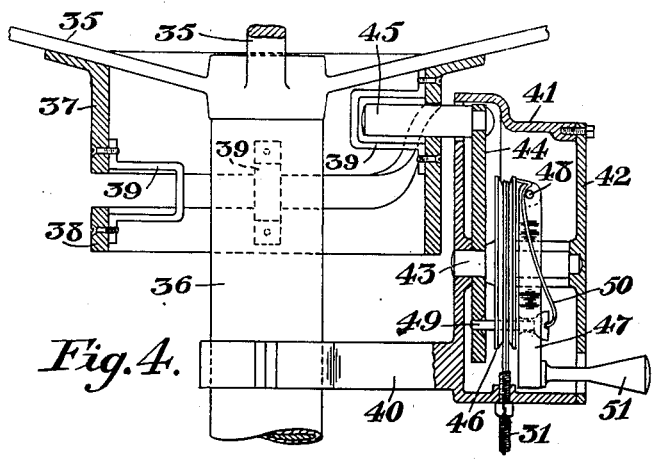
Figure 5:
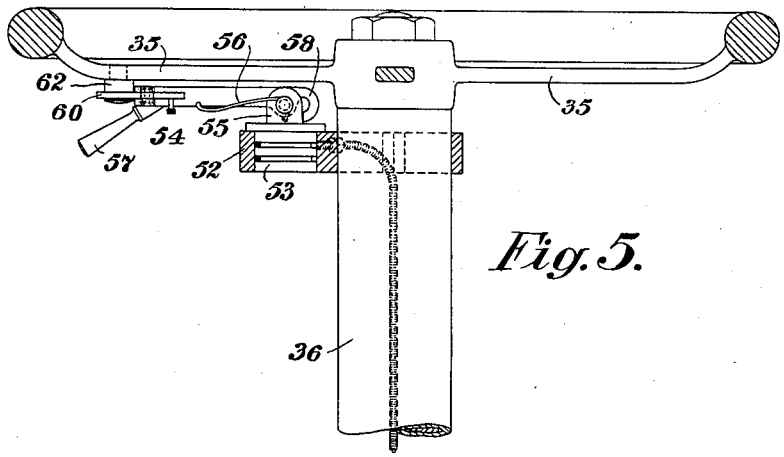
Figure 6:
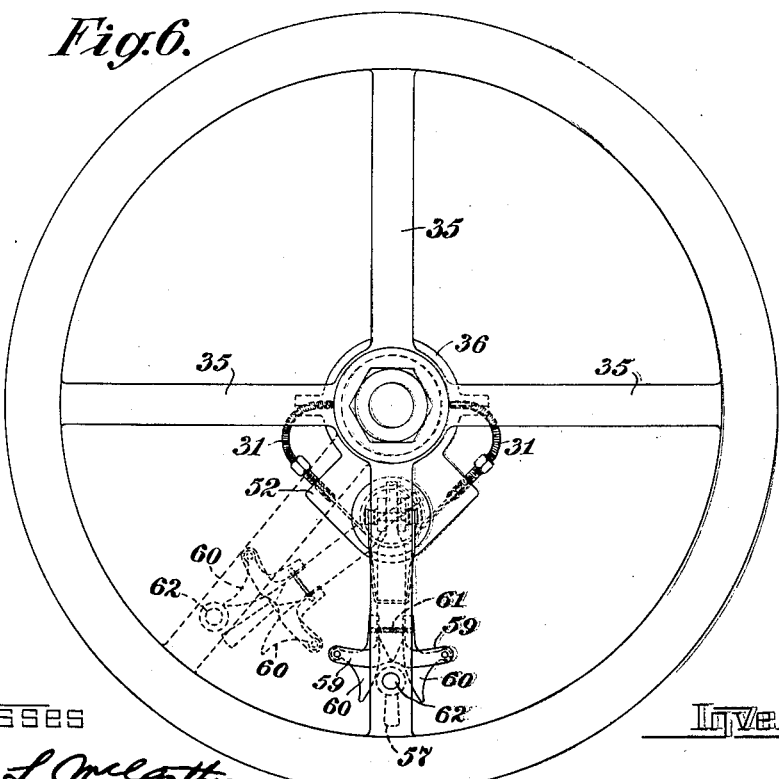

In the accompanying drawings:—Figure 1 is a front elevation, and Fig. 2 is a cross section showing a suitable form of indicator which may be used with the operating mechanism according to the present invention. Figs. 3 and 4 show respectively a front elevation with the front disk removed, and a section of an operating mechanism constructed according to the invention. Fig. 5 is an elevation partly in section, and Fig. 6 is a plan view showing another form of operating mechanism. Figs. 5ᵃ and 6ᵃ are an elevation and a plan view respectively of parts of the arrangements shown in Figs. 5 and 6. Fig. 7 is an elevation partly broken away, and Fig. 8 is a cross section showing a third form of the operating mechanism. Figs. 9 and 10 are detail views of the mechanism shown in Figs. 7 and 8.

Referring first to Figs. 1 and 2 it will be seen that an indicating apparatus is shown having a sign at the top thereof which is operated to show when the brakes are applied to slow up the vehicle, and having a moving pointer at the bottom to show when the vehicle is about to turn toward the right or the left. Of course the apparatus need not be exactly as shown and the direction indicator or moving pointer may be used without the "slow-up" sign if required. In the drawing the two parts of the indicator are shown as being supported on the one base 7, which has an approximately semi-cylindrical part 8 at the top thereof containing the "slow-up" sign, and an approximately semi-circular part 9 at the bottom thereof forming the case of the direction indicator. The "slow-up" sign may be formed by a stencil plate 10 lying over a transparent or semi-transparent plate 11, both of these being curved and suitably supported for instance on members 12 projecting from the back of the casing. 13 are curved shutters which normally meet at the front and close over the "slow-up" sign so as to obscure it. These shutters are pivoted at 14 and geared together at 15, while they are adapted to be operated by means of an arm 16 connected to one of the shutters, and with a wire 17 attached thereto leading for instance to a cam device which is actuated in the first part of the movement of the brake pedal or brake lever. A spring 18 with an adjusting screw 19 normally holds the shutters 13 closed. Electric lamps 20 are used to illuminate the sign at night and contact springs 21 are arranged to have the circuit between them closed by one of the shutters when these latter are opened so that the lamps 20 are only thrown into circuit when the shutters are opened. Of course there is a separate switch in the circuit for connecting the battery therein at night or only when it is necessary to illumine the indicator. A curved lip 22 is designed to prevent mud from splashing up into the "slow-up" sign. 23 is the pointer of the direction indicator supported on a shaft 26, and working over a suitable face 24 preferably of white or opal glass against which the pointer 23 will be readily seen, and which can be illumined when required at night by lamps 34 at the back thereof. A lip 25 on the casing is also designed to prevent mud from splashing up on to the face of the direction indicator, In the example of construction shown the pointer 23 is not directly operated from the mechanism at the steering wheel, but it is actuated through a pair of oval gear wheels 27—28 for the purpose of making the movement greater at the first part of the movement from the mid-position toward either side. This is not by any means essential however. The wheel 28 is on a spindle 29 carrying a grooved pulley 30 over which passes a wire suitably anchored to the pulley at one point and extending for instance through Bowden sheaths or tubes 31 to the operating mechanism. A bracket 32 carries the spindles 26 and 29 and the ends of the Bowden tubes and also carries a contact making device 33 by which the circuits of one or other of the lamps 34 are closed when the current is thrown on, and when the pointer 23 is turned toward one side or other. The front plate 24 of the indicator may have the letters "L" and "R" painted or formed upon it as seen in Fig. 1 and the circuits closed by the movement of the pointer 23 will include the lamps behind the respective letters toward or over which the indicator pointer will be moving. It will be clearly understood that this indicating apparatus is mentioned by way of example only and other types of indicating apparatus with moving pointers therein may be used in conjunction with the operating mechanism forming the subject of the invention. This indicating apparatus however will serve to show how the movement of a wire passing around a pulley can be used to operate a direction indicator, and in the description of the devices which follow it will not be necessary to show more than the mechanism for moving such a wire attached to an operating pulley.

Referring now to Figs. 3 and 4 a convenient form of operating mechanism will be seen. 35 are the spokes of a steering wheel of a motor car, and 36 is the stationary casing or sleeve through which the steering column passes. The sleeve 36 is shown vertical in the drawing but of course as a rule it would be inclined at an angle to the vertical. This would make no difference however to the device about to be described. 37 is a cylindrical member suitably attached to the steering wheel or the spokes thereof, and connected by brackets 39 to another member 38 of the same circumference. Between these two members 37 and 38 a groove is formed as shown, and this groove constitutes a cam for operating the indicating mechanism. A bracket 40 clamped upon the sleeve 36 carries a casing 41 closed at the front by a disk 42. A shaft 43 passes through the casing from the back to the front thereof and has a disk 44 mounted to turn freely thereon. A pin 45 projecting from the disk 44 works in the groove between the members 37 and 38. This groove is of a form shown in dotted lines in Fig. 3 which shows the apparatus in its mid-position. If the steering wheel is turned toward one side or other from its mid-position the pin 45 is moved over toward that side, while the disk 44 is turned until the pin 45 comes into the horizontal portion of the groove, after which any further turning movement of the steering wheel toward that side will have no effect upon the disk 44. When the steering wheel is brought back toward its mid-position however the lower wall of the groove, that is to say the upper curved edge of the member 38 will serve to raise the pin 45 again and to bring it back to the mid-position shown in Fig. 3. By making the groove of a suitable curvature the movement of the pointer 23 can be made as rapid as required at the beginning of the steering movement so that with such an operating mechanism the oval gear wheels 27 and 28 are not necessary although they may be used if desired. The wires carried through the tubes 31 are brought into the casing 41 and carried over and attached to a pulley 46 which also revolves freely upon the shaft 43. 47 is a handle pivoted at 48 on a lug on the pulley 46. 49 is a pin the head of which normally rests in a hollow in the handle member as seen in Fig. 4, while the pin passes through a hole in the pulley 46 and into a recess or hole with a flared opening in the disk 44. A spring 50 normally presses the pin 49 and handle 47 inward. The handle 47 is formed or slotted to pass around the shaft 43 and has a projecting piece or grip 51 passing through a slot in the front wall 42 of the casing, so that it can be conveniently actuated by hand. The length of the slot in the wall 42 corresponds with the total amount of movement which the handle will make when the pin 49 is in engagement with the disk 44, so that the handle and pulley are turned with the disk 44 when this latter is turned by the groove cam arrangement above explained. Normally the pin 49 is in engagement with the disk 44 as shown, and the pulley 46 is therefore turned so that the indicator is operated whenever the disk 44 is turned as a consequence of turning movements of the steering wheel 35. If however it is desired by the driver of the vehicle to give an advance signal at any time before he takes a turn to one side or other, this can be done by pulling outward the grip 51 of the handle 47 against the action of the spring 50, whereby the end of the pin 49 will be released from the disk 44, and then the handle can be turned to the right or left according to the direction in which the steering wheel is about to be turned, to indicate the corresponding turning movement of the vehicle. When the grip 51 is released the pin 49 will come to rest against the smooth face of the disk 44 and then when the steering movement is actually made the disk 44 will turn until the hole in the disk comes behind the pin 49, whereupon the spring 50 will move back the handle and the pin into engagement with the disk 44. When the steering wheel is brought back to the mid-position again the operating mechanism will therefore return to its mid-position and the automatic operation of the indicator will proceed as before.

The mechanism above described can be taken as an example of what is probably the best mechanism for the purpose. There are other ways however in which the desired result can be attained. Another construction is shown in Figs. 5 and 6, which may be rather cheaper to make than the construction of Figs. 3 and 4. Referring to Figs. 5 and 6, 36 is again the stationary sleeve through which the steering column passes and 35 are the spokes of the steering wheel. 52 is a bracket clamped to the stationary sleeve 36. In this bracket works a revoluble cylinder or plug 53 grooved to form a pulley around which the wire for operating the direction indicator passes. The Bowden tubes 31 may be connected to the bracket 52 as shown, and may then be carried down the sides of the stationary sleeve 36. On the top of the cylinder or plug 53 a handle 54 is mounted preferably between the lugs 55 as shown, while a spring 56 tends to lift the front end of the handle 54. In order to limit the movement of the handle it may have a tail piece 58 which can be bent or filed off at its point when required for adjustment, the point or end of the piece 58 being adapted to rest against the base of the lugs 55. The handle 54 has a suitable grip 57 connected to it and is formed with projecting lugs 59 at its end on which are pivoted members 60 which may be conveniently referred to as ears. The ears 60 are formed with tail pieces at the rear where they are drawn together by means of springs 61 so as normally to hold the ears in the position shown in Fig. 6. In this position the ears and the end of the handle 54 form between them a notch or slot in which a pin 62 projecting downwardly from one of the spokes 35 of the steering wheel normally engages. It will be seen that the curved paths in which the pin 62 and the end of the handle 54 will move as the steering wheel is turned, will be different, the circle representing the path of the end of the handle being considerably smaller than the circle representing the path of the pin 62. Hence as the steering wheel is turned while the pin 62 is in engagement between the ears 60, as shown at the bottom of Fig. 6, the handle 54 will be carried around with the steering wheel until the pin 62 leaves the notch between the ears 60 which occurs after the handle has moved through about 60 degrees from its mid-position in the example of construction shown. The dotted lines at the left-hand side in Fig. 6 represent the position in which the pin 62 escapes from the ears 60 at the end of the handle. The movement of the indicator therefore is produced by the first part of the turning movement of the steering wheel toward either side from its mid position and after a certain angle of movement of the steering wheel the indicator will not be further affected. The pin 62 will move away from the handle member and will subsequently return and reëngage the handle member or rather the ears 62 on the end thereof. The same action occurs in turning toward either side. The pin 62 can press backward or inward the ends of the ears 60 in order to move past these ears as the pin approaches from outside, but once the pin has passed one of the ears and has come into the notch between the ears, it cannot press back the other ear and will therefore move the handle member in the way described. If it is required at any time to give a premonitory signal before taking a turn the grip 57 of the handle is simply pulled downward sufficiently to bring the ears 60 below the end of the pin 62 whereupon the handle can be turned toward one side to give the required indication. Any suitable stops may be provided as for instance pins (not shown) on the bracket 52 for limiting the turning movement of the handle toward either side. The handle is left with the indicator in the desired position and then when the turn is taken and the steering wheel is moved the pin 62 will pass the innermost ear 60, moving onward as far as required and then returning and reëngaging between the ears 60 in the manner already explained so that the automatic operation of the indicator is resumed.

Referring now to Figs. 7 to 10, it will be seen that another construction is there shown. 36 again represents the stationary sleeve, and 75 is the casing of the operating mechanism clamped upon the sleeve by brackets 76. 35 are the spokes of the steering wheel connected by bolts 71 to an internally toothed ring 72. 73 is a pinion gearing with the internally toothed ring 72, the shaft of this pinion being carried downward through a sleeve 74 on the casing 75, and having a worm 77 mounted upon it as shown in Fig. 7. This worm gears with a worm wheel 78 formed on a dish-shaped member 79 which is mounted to turn freely on a sleeve 80 which itself turns freely on a shaft 81. 82 is a pulley which is fixed on the sleeve 80. The forward end of the shaft 81 is carried in the front plate 88 of the casing 75. 84 is a handle having its rear end forked to embrace a flattened or reduced portion of the sleeve 80, on which it is held by a pin 85. The rear ends 86 of the forks of the handle 84 are connected by tension springs 90 to points in the circumference of the dish-shaped member 79. Another spring 89 tends to pull the upper end of the handle inward. The handle 84 has a grip 87 which projects through an opening left in the upper part of the casing by cutting away the front plate 88 around its upper edge. A projection 91 on the handle normally engages in a notch 92 in the edge of the dish-shaped member 79, the edge of this member being otherwise plain. The spring 89 holds the projection 91 in engagement with the notch 92 and the springs 89 and 90 all tend to pull the handle back to the normal position if it is drawn back and turned to one side relatively to the member 79. The spring 89 alone would serve the required purpose without the use of the springs 90, but these latter make the action more certain. The handle 84 has another projection 94 on its edge adapted to be engaged with projections 95 near the ends of the edges of the exposed portion of the casing 75. When the handle is pulled back therefore and turned to one side or other for the purpose of giving a premonitory signal it can be engaged with one of the projections 95. When the handle is so turned it is disengaged from the member 79 but turns the pulley 82 through the sleeve 80. A plate 96 slotted at 103 to work over a pin 97 serves to disengage the projection 94 on the handle from the projection 95 on the casing, the arrangement being the same for each side of the device. The plate 96 is guided by a pin 102 working in a slot 101, while a catch 98 pivoted at 99 on the plate 96 normally stands in the position shown in Fig. 9 in which it is held by the spring 100. Assuming a premonitory signal to have been given so that the handle is in the position of Fig. 9, the subsequent steering movement will cause the dish-shaped members 79 to be turned, and a pin 93 on this member will ultimately press down and pass over the catch 98. The pin 93 may move farther in the same direction but is brought back when the steering wheel is returned toward its mid-position and the pin then engages with the face of the catch 98. The catch cannot turn backward farther than the position shown in Fig. 9 so that any pull on the catch in this direction will draw the whole plate 96 backward. Owing to the action of the pins 97 and 102 in their slots 103 and 101, the plate 96 is turned and its front end lifts the projection 94 out of the notch in which it lies thus releasing the lever 84 and permitting it to return to its normal position in which its projection 91 reëngages with the notch 92. The pin 93 slips over the point of the catch 98 when the plate 96 has moved backward and turned sufficiently and the parts revert to their normal position.

The descriptions above given of mechanism for operating the direction indicator and for enabling it to be adjusted by hand and to automatically return to its automatic driving connection with the steering apparatus, will show sufficiently how the desired result may be obtained and how the mechanism may be modified without departing from the scope of the invention. There will always be a member turned by the steering wheel or steering mechanism, a pulley or the like transmitting the movement to the indicator through suitable connections, and means for connecting the pulley to the member turned by the steering mechanism, the connecting means being under the control of a handle which can be moved to give premonitory signals, and which will return to its normal connecting position for automatic operation after the premonitory signal has served its purpose.

I declare that what I claim is:—

1. Operating mechanism for a direction indicator applicable to vehicles, comprising a member adapted to be permanently connected with the steering mechanism, a second member, and means operatively connecting it with the indicator mechanism, releasable means for operatively connecting said second member with said first member, and manually operable means for releasing this connection and for moving said second member.

2. Operating mechanism for a direction indicator applicable to vehicles, comprising a member adapted to be permanently connected with the steering mechanism, a second member and means operatively connecting it with the indicator mechanism, a handle, pivotal connecting and driving means between said second member and said handle, connecting means between said handle and said first member, said means being releasable by the movement of the handle about its pivot, and a spring device acting upon said handle and resisting the releasing movement.

3. Operating mechanism for a direction indicator applicable to vehicles, comprising a support, a member mounted to turn in the support, operative connecting means between said member and the indicator mechanism whereby said mechanism is controlled by the turning of said member, a handle and a pivoted support therefor on said turning member, the axis of pivoting of the handle being at right angles to the turning axis of the member aforesaid, spring means tending to turn the handle member in one direction, a member adapted to be connected with the steering mechanism so as to be moved thereby, and means of engagement between said member and the handle, said means being releasable by turning the handle about its pivot against the action of the spring means aforesaid.

4. Operating mechanism for a direction indicator applicable to vehicles, comprising a support, a member mounted to turn in the support, operative connecting means between the said member and the indicator mechanism whereby said mechanism is controlled by the turning of the said member, a handle connected with said turning member for rotation therewith, but movable otherwise relative thereto, means adapted to be connected to the steering mechanism and adapted to turn the said handle together with the turning member to which the handle is connected when the handle is in one position in regard to the turning member aforesaid, or to reëngage and turn the said handle after it has been disengaged and turned independently, when the respective parts again reach a position for reëngagement.

5. Operating mechanism for a direction indicator applicable to vehicles, comprising two members the first of which is adapted to be permanently connected with the steering mechanism and the second to be operatively connected with the indicator mechanism, releasable means for operatively connecting said second member with said first member, said means including a spring device resisting the release of said connecting means, and a handle serving as manually operated means for releasing the connecting means and turning the second member relative to the first, means associated with said spring device for reëstablishing the operative connection between the two members when the first member has been moved so as to occupy a certain position relative to the second member.

6. Operating mechanism for a direction indicator applicable to vehicles, comprising two members the first of which is adapted to be permanently connected with the steering mechanism and the other operatively connected with the indicator mechanism, a mounting for said second member constraining it to move in a fixed path, a handle, means for attaching said handle to the second member so as to have a driving connection in the direction of motion of said member and freedom of movement in another direction, means including a spring catch for operatively connecting the handle with the first member, said means being adapted to be put out of action by the free movement of the handle.

7. Operating mechanism for a direction indicator applicable to vehicles, comprising a support, an arm mounted to turn therein, means for transmitting the turning movement of said arm to the indicator mechanism, means permitting the arm to turn into a plane different from that in which its movement affects the indicator mechanism, a pin and a member carrying said pin adapted to move whenever a steering movement is made, spring means carried by the said arm for connecting it with the pin for a certain part of the path of movement thereof, said means being taken out of action by the turning of the arm in the plane in which it is inoperative as regards the indicator.

In witness whereof, I have hereunto signed my name this 18th day of March, 1912, in the presence of two subscribing witnesses.

ROBERT HALLER HUTCHINSON.

Witnesses:
HENRY HERBERT STANLEY MARSH,
WILLIAM THOMAS EDGLEY BLUNDEN.